United States Patent [19]

Meekins

[11] Patent Number: 4,763,604

[45] Date of Patent: Aug. 16, 1988

[54] HERB-STUFFED PET ACCESSORY FOR NATURALLY REPELLING FLEAS AND TICKS

[76] Inventor: Victoria Meekins, 222 East 51st. St., 10022

[21] Appl. No.: 9,767

[22] Filed: Feb. 2, 1987

[51] Int. Cl.$^4$ ............................................. A01K 45/00
[52] U.S. Cl. .......................................... 119/1; 119/156
[58] Field of Search ................... 119/1, 29, 29.5, 106, 119/156; 5/435, 438; D30/38, 39, 41

[56] References Cited

U.S. PATENT DOCUMENTS

| | | | |
|---|---|---|---|
| D. 206,749 | 1/1967 | Klimkiewicz | D30/38 |
| 1,569,710 | 1/1926 | Burt | 119/1 |
| 2,032,248 | 2/1936 | Bins | 119/1 |
| 2,185,547 | 1/1940 | Fowler | 119/29 |
| 2,342,066 | 2/1944 | Tramill | 119/106 |
| 2,401,253 | 5/1946 | Lamb | 119/106 |
| 2,775,222 | 12/1956 | Kruck | D30/41 |
| 3,299,451 | 1/1967 | Trogdon | 5/437 |
| 4,008,688 | 2/1977 | Nicholas | 119/159 |
| 4,050,417 | 9/1977 | Ellis | 119/156 |
| 4,193,986 | 3/1980 | Cox | 119/106 |

Primary Examiner—John J. Wilson
Attorney, Agent, or Firm—Kirschstein, Kirschstein, Ottinger & Israel

[57] ABSTRACT

An herb-stuffed, pest-repellent pet accessory in the form of a bone naturally repels pests from the vicinity of the accessory. The accessory may be used as a cushion or pillow against which the pet may nestle, or may be worn by the pet on a pet collar.

3 Claims, 2 Drawing Sheets

HERB-STUFFED PET ACCESSORY FOR NATURALLY REPELLING FLEAS AND TICKS

BACKGROUND OF THE INVENTION

1. Field of the Invention

This invention generally relates to a pet accessory stuffed with herbs for naturally repelling fleas and ticks and, more particularly, to such an accessory which is in the form of a bone or bow tie which can be used either as a pillow in a pet bed, or worn on a pet collar.

2. Description of Related Art

Chemically-impregnated flea collars are, of course, well known among pet owners for repelling fleas, ticks and like pests. Although effective for their intended purpose, such chemically-impregnated collars have not proven to be altogether satisfactory in those cases where the animal's collar becomes wet, for example, when the animal is being bathed or caught in the rain, or where the flea collars are left on the pet for protracted time periods beyond those recommended by the manufacturer. Under such circumstances, it has been observed that traces of the chemicals impregnating the collars are absorbed into the skin of the pet, with possible risk to the health of the animal due to such chemical absorption. Pet owners are usually advised to remove wet flea collars, and to avoid keeping the flea collars on for protracted lengths of time. However, experience has shown that many owners neglect such advice, thereby leading to potential health risks for the animal.

Pet beds, stretchers and sleeping bags having powdered insecticide chemicals for repelling fleas are also known in the art. See, for example, U.S. Pat. Nos. 4,008,688; 4,050,417 and 4,169,428. Again, the use of such chemical insecticides, although effective for repelling pests, are not safe for the animal, particularly should the animal bite into the bed, stretcher, scratcher, sleeping bag or the like, and ingest or inhale chemical insecticides contained therein. The risk of inhalation of such air-borne insecticides extends as well to the pet owners themselves.

It is also known to provide bone-shaped or dumbbell-shaped hard toys with which pets play. Such toys can be impregnated with meat or garlic odors in order to attract the animal. It has been further proposed to provide pet pillows stuffed with resilientlycompressible stuffing. See, for example, U.S. Pat. Nos. 2,185,547; 3,104,648 and 3,902,456.

SUMMARY OF THE INVENTION

1. Objects of the Invention

It is a general object of this invention to overcome the aforementioned drawbacks associated with pest repellents for pets.

It is another object of this invention to repel fleas, ticks and other pests in a natural and healthful way.

It is a further object of this invention to repel such pests without exposing the pets or their owners to the risk of ingesting or inhaling air-borne chemical insecticides.

Still another object of this invention is to effectively repel such pests without exposing the animals to the risk of chemical absorption through the skin.

Yet another object of this invention is to not only effectively repel pests, but also to provide an attractive ornament for the pet to wear.

A still further object of this invention is to not only effectively repel such pests, but also to provide a soft pillow or cushion against which the pet may comfortably nestle.

2. Features of the Invention

In keeping with these objects, and others which will become apparent hereinafter, one feature of this invention resides, briefly stated, in a flea-and-tick-repellent pet accessory comprising a soft, porous cover, preferably made of cotton fabric, and bounding an interior space, as well as a stuffing in the interior space. The stuffing imparts to the cover a three-dimensional configuration generally resembling a bone or bow tie. The stuffing includes at least one aromatic herb in a particulate form. The herb emits a scent through the stuffed, porous cover which naturally, i.e. without the aid of chemicals, repels fleas and ticks and other like pests from the vicinity of the accessory.

According to the invention, the use of aromatic flea-and-tick-repellent herbs avoids exposing the animals and their owners to the risks of ingesting or inhaling chemical insecticides, as well as preventing chemical absorption of insecticides through the pet's skin. By providing the herb in particulate form and filling the cover, a soft, comfortable cushion or pillow is provided against which the pet may comfortably nestle. By forming the cover in a bone shape, the accessory represents a familiar object to the pet so that the pet will be attracted to it. By forming the cover in a bow tie shape, and with the further expedient of providing a loop on the cover, the loop being mounted on a pet collar, the accessory may be conveniently supported on the pet collar and represents an attractive fashion statement.

According to a preferred embodiment, the stuffing includes a mixture of herbs, said one herb being pennyroyal. Another of the herbs may advantageously be rue. It is advantageous if the pennyroyal and rue are mixed in a four parts pennyroyal to one part rue ratio. The herbs need not, and advantageously do not, comprise the stuffing since, in many case, in order to reduce costs and decrease the scent, a filler of buckwheat hulls constitutes the predominant part of the stuffing. The buckwheat hulls, as well as the rue and pennyroyal, are intermixed and are in particulate form.

Another feature of this invention resides in positioning an outer soft, porous jacket about the stuffed cover. This outer jacket is removable from the stuffed cover for cleaning porposes. The jacket is formed with an aperture, and means, e.g. a zipper, is provided for opening the aperture to permit insertion and removal of the stuffed cover through the open aperture and for closing the aperture to impart to the jacket a three-dimensional configuration generally resembling a bone. Thus, the outer jacket can be removed for periodic cleaning in the event that the pet should soil the jacket, or fresh stuffed covers may replace stale stuffed covers, i.e. covers which have lost their pest-repellent scent.

As stated above, the pet accessory, with or without the outer jacket, may be used as a pet pillow or cushion and be placed anywhere within a pet bed or, for that matter anywhere around the house at which the pet usually loiters.

Also, by providing a loop which is attached on the cover, and by inserting a pet collar through the loop, the pet may wear the bow tie-resembling accessory about its neck, thereby making a fashion statement as well as serving the practical purpose of repelling pests.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
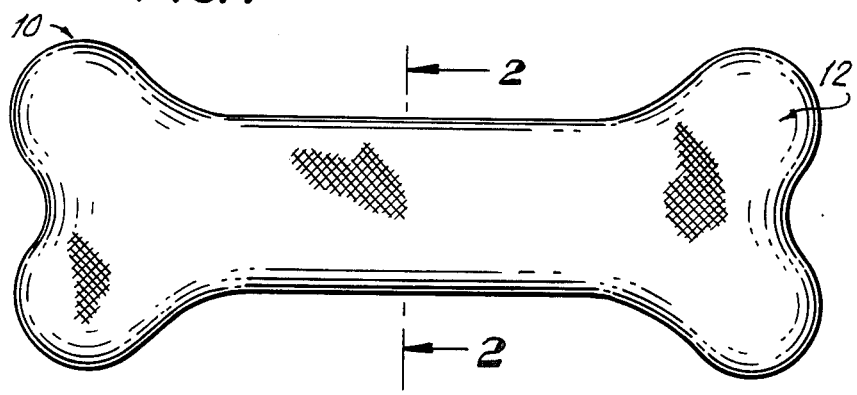
FIG. 1 is a front view of one embodiment of a pet accessory in accordance with this invention.
Figure 2:
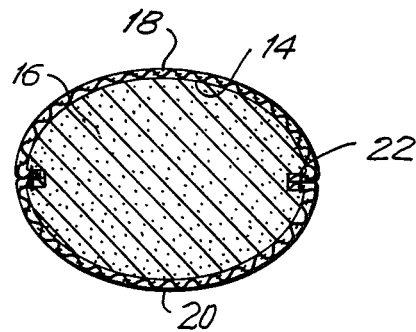
FIG. 2 is a sectional view taken on line 2—2 of FIG. 1.

Referring now to the drawings and, more particularly, to FIGS. 1 and 2 thereof, reference numeral 10 generally identifies a first embodiment of a pest-repellent pet accessory which comprises a soft, porous cover 12 bounding an interior space 14, and a stuffing 16 filling the interior space. The cover advantageously includes a pair of generally bone-shaped planar sections 18, 20, preferably constituted of fabric, e.g. cotton. Each section 18, 20 has a peripheral edge. The sections 18, 20 overlie each other and are stitched together by stitching 22 which extends along the entire length of the peripheral edges to close the interior space 14 filled with the stuffing 16.

The stuffing 16 includes as its predominant constituent a filler of buckwheat hulls in particulate form which serve no aromatic purpose, but are intended solely as a filler to provide bulk to the accessory. The stuffing further includes at least one, and preferably two, aromatic herbs, e.g. pennyroyal and rue, which are advantageously mixed in the ratio of four parts by weight of pennyroyal and one part by weight of rue. These herbs emit a scent through the stuffed porous cover 12 which naturally repels fleas, ticks and like pests from the circumambient region of the accessory. The stuffing 16 is sufficient to impart to the cover 12 a three-dimensional configuration which, as shown in FIG. 1, generally resembles a bone.

Figure 3:
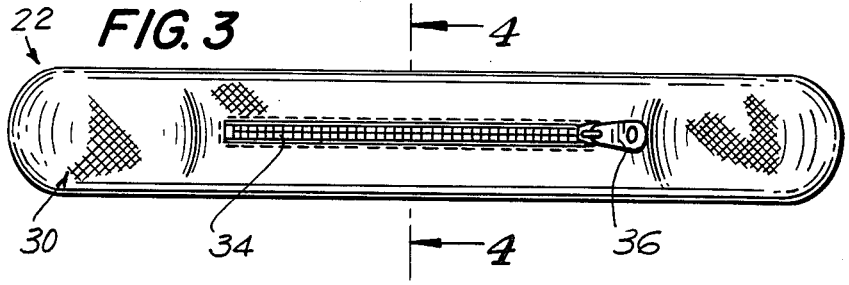
FIG. 3 is a side view of another pet accessory in accordance with a second embodiment of this invention.
Figure 4:
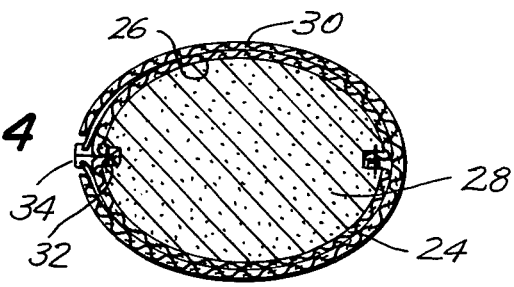
FIG. 4 is a sectional view taken on line 4—4 of FIG. 3.

In a variant of this invention, as shown in FIGS. 3 and 4, a pet accessory 22 comprises a soft, porous cover 24 bounding an interior space 26, as well as a stuffing 28 filling the interior space 26. The stuffed cover 24 is identical to the stuffed cover 12 described in connection with FIGS. 1 and 2 and, hence, requires no further description. An outer soft, porous jacket 30, also advantageously constituted of fabric such as cotton, is positionable in a mounted state, as shown in the drawings, about the stuffed cover 24. The jacket 30 is removable to a removed state from the stuffed cover 24. The jacket 30 has an aperture 32, and closure means, e.g. zipper 34 having a pull 36. The pull 36 may be pulled in one direction for opening the aperture 32 to permit insertion and removal of the stuffed cover 24 through the open aperture. The pull 36 may be moved in the opposite direction for closing the aperture 32 to impart to the jacket 30 a three-dimensional configuration generally resembling a bone. The jacket 32 closely surrounds, and has the same shape as, the stuffed cover 24, and serves to protect the latter from being soiled. Should the jacket 30 be soiled in use, then it can be easily removed from the cover and laundered. Should the cover 24 become stale, i.e. no longer emitting its pest-repellent scent, then a fresh herb-stuffed cover may be inserted into the jacket.

Figure 5:
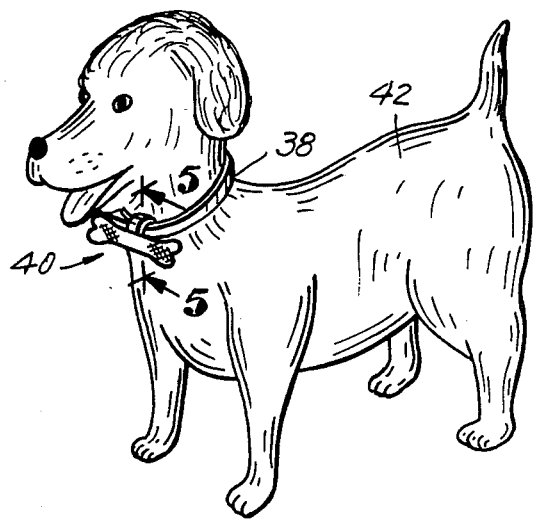
FIG. 5 is a perspective view of a pet accessory in accordance with a third embodiment of this invention, as worn by a pet.
Figure 6:
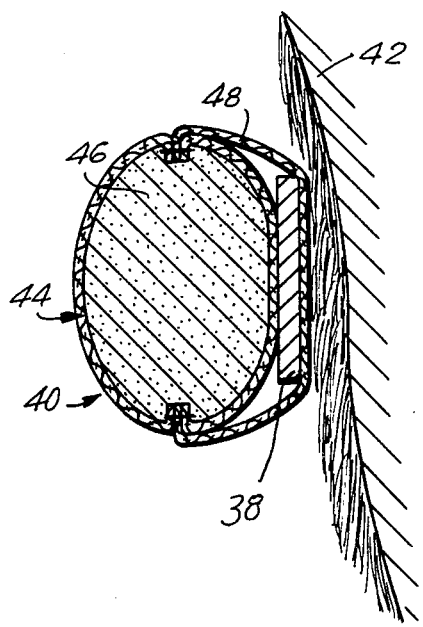
FIG. 6 is an enlarged sectional view taken on line 6—6 of FIG. 5.

Turning to the final embodiment of FIGS. 5 and 6, a pet accessory 40 is shown mounted on a pet collar 38 worn around the neck of a pet 42. The accessory 40 is in all respects identical to the embodiment of FIGS. 1 and 2 in that it comprises a soft, porous cover 44, and a stuffing 46 within the cover 44. Hence, a detailed description of the accessory 40 is not believed to be necessary. The essential difference lies in the provision of means, e.g. a loop 48, provided on the cover 44 for supporting the accessory 40 on the pet collar 38. The loop 48 constitutes an elongated strip of material, preferably a cotton fabric, whose opposite ends are stitched to one of the sections of the cover in order to form a closed loop through which the collar 38 passes.

As shown in FIG. 5, the bone-shaped accessory also roughly resembles a bow tie and, when worn by the pet at the front of the neck, makes a very attractive "dressed-up" appearance.

In all of the aforementioned embodiments, the scent emitted by the aromatic herb or herbs passes through the interstices of the cover and/or the jacket. No chemical insecticides are used, thereby protecting the animal's health.

It will be understood that each of the elements described above, or two or more together, also may find a useful application in other types of constructions differing from the types described above.

While the invention has been illustrated and described as embodied in a herb-stuffed pet accessory for naturally repelling fleas and ticks, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A flea-repellant pet pillow, comprising:
    (a) a soft, porous fabric cover including a pair of juxtaposed, generally bone-shaped, fabric sheets having circumferentially-complete peripheral edges stitched together to bound an interior space, said cover having an elongated central portion of generally constant cross-section, and opposite end portions of enlarged cross-section compared to that of the central portion, each end portion having a pair of projections diverging away from each other in an outward direction away from the central portion;
    (b) a stuffing in particulate form filling the interior space of the cover and outwardly plumping the juxtaposed sheets to form a three-dimentional, soft, sculptured, stuffed cover generally resembling a bone, said stuffing including a particulate inert filler, particulate pennyroyal and particulate rue together including an aromatic mixture whose scent is emitted through the porous cover to naturally repel fleas from the vicinity of the pillow;

(c) a soft, porous fabric, outer jacket bounding an interior and having an elongated intermediate region of generally constant cross-section larger than that of the central portion of the cover, and opposite end regions of enlarged cross-section larger than those of the end portions of the cover, said jacket having an aperture through which the stuffed cover is inserted to stuff the interior of the jacket and to outwardly plump the jacket to form a three-dimensional, soft, sculpured, stuffed jacket generally resembling a bone against which a pet can nestle, said jacket having pores through which the scent of the aromatic mixture passes to repel fleas from the vicinity of the pillow; and (d) means for opening the aperture to permit removal of the stuffed cover from the outer jacket to permit replacement of the sutffed cover as well as cleaning of the jacket.

2. The pillow as recited in claim 1, wherein the filler is buckwheat hulls, and wherein the pennyroyal and the rue are mixed in the ratio of four parts by weight of pennyroyal to one part by weight of rue.

3. The pillow as recited in claim 1, wherein the stuffed cover has a loop for suspending the stuffed cover on a pet collar.

* * * * *